March 21, 1939.  E. BECKER  2,150,904
DIAPHRAGM CELL ACTUATOR
Filed Aug. 17, 1937
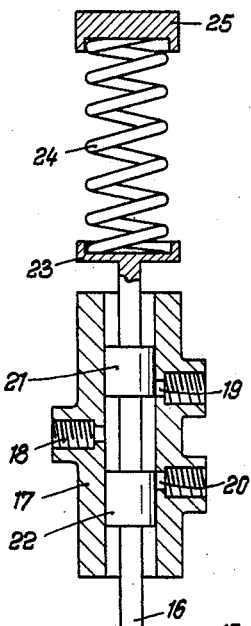
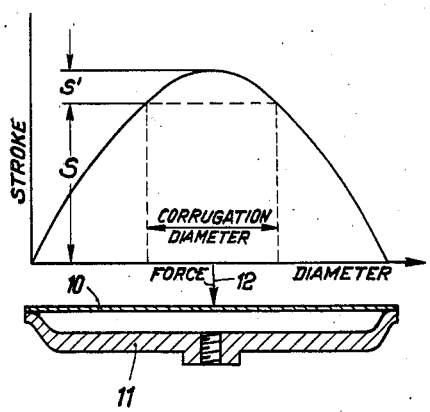
Fig. 1
Fig. 2
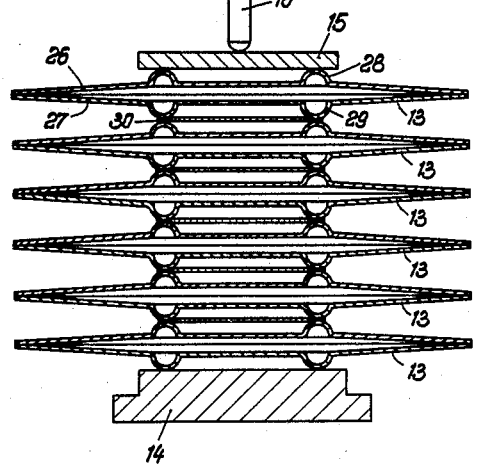
Inventor:
Ewald Becker Patented Mar. 21, 1939

2,150,904

UNITED STATES PATENT OFFICE 2,150,904

DIAPHRAGM CELL ACTUATOR

Ewald Becker, Berlin-Steglitz, Germany, assignor to Askania-Werke A. G., a corporation of Germany Application August 17, 1937, Serial No. 159,599
In Germany August 18, 1936

3 Claims. (Cl. 137—156.5)

This invention relates to a diaphragm cell actuator, more particularly to an actuator for operating measuring and control devices in response to changes of the air density.

Heretofore, as far as I am aware, it has been the practice to employ in measuring and control devices of the above referred to character a pressure responsive member in the form of the usual metallic sylphon or bellows or a plurality of the conventional corrugated diaphragm cells. These conventional pressure and density responsive members I have found to be disadvantageous and unsuitable for precision regulators. The sylphon or bellows, for example, does not respond correctly to temperature and pressure changes on account of the strain imparted to the material when forming the sylphon. The diaphragm cells, on the other hand, usually do not expand and contract correctly in response to density changes due to the stiffness imparted to the cells by the corrugations. Finally, both the syphon and a stack of diaphragm cells possess little radial stiffness and have the tendency to wobble or oscillate when subjected to vibration. The latter quality makes the conventional element unsuitable for regulators on board aircraft, for example.

To overcome the hereinbefore outlined disadvantages I propose to form a diaphragm cell actuator of a plurality of superposed cells, each cell being made of two shells in the form of a frustum or a truncated cone and provided with a single annular and outwardly projecting corrugation. The cells are interconnected by metallically securing the corrugations of two adjoining cells with each other, such as by welding or soldering. The diaphragm cell actuator thus obtained responds to air density changes with great accuracy. It is suitable for operating a relay of a regulator, even under load, and remains uneffected by vibration on account of its great stiffness in radial direction. The diaphragm cell actuator moreover possesses a relatively small size as compared to a stack of cells interconnected by stubs or the like.

The object, aims and advantages of this invention will become clear from a consideration of this description together with the accompanying drawing in which an embodiment of my invention is shown for purely illustrative purpose.

It is to be understood, however, that the description is not to be taken in a limiting sense, the scope of this invention being defined in the appended claims.

Referring to the drawing:

Fig. 1 is a diagram showing the operation of a flat diaphragm subjected to a pressure.

Fig. 2 is a sectional elevation of a diaphragm cell actuator in connection with a spring loaded control valve.

The curve of Fig. 1 illustrates the magnitude of stroke of a flat diaphragm 10 sealing a diaphragm chamber 11 and being acted upon by a pressure inside the chamber. The stroke of the diaphragm in the center is $S+s'$. When an outward force is applied to the diaphragm in the direction of the arrow 12, for instance by means of a spring loading a valve, the stroke of the diaphragm is reduced in the center by an amount $s'$. From the foregoing it appears that a diaphragm having a flat surface is very responsive to outward forces on account of its little stiffness. It has therefore been the practice to impress a plurality of corrugations into the diaphragm wall thereby making the diaphragm stiffer. The greatly increased stiffness, however, is equally disadvantageous as it decreases the stroke of the diaphragm due to the spring action of the corrugated metal.

The improved diaphragm cell actuator is shown in Fig. 2 as consisting of six single cells 13. The lowermost cell bears against a fixed support 14 while the uppermost cell is provided with a pressure plate 15 bearing against a valve stem 16 of a valve 17 of conventional construction. The valve may be supplied with pressure fluid to an inlet port 18 and possesses two outlet ports 19 and 20 controlled by cylindrical valve members 21 and 22. The stem 16 is further provided with a disc 23 receiving the one end of a spring 24 which bears with its other end against a fixed support 25. Each diaphragm cell is composed of two shells 26 and 27 shaped in the form of a frustum or truncated cone and provided with a single outwardly projected corrugation 28 and 29.

The shells 26 and 27 are tightly connected at the rim in a conventional manner, such as by welding or soldering. Two adjoining cells are also metallically interconnected at 30 by welding or soldering. It is easily apparent from the drawing that the diaphragm cell actuator will be very stiff in radial direction and not respond to vibrations imparting a radial force to the actuator as indicated by the arrow 31.

Referring again to Fig. 1, it is seen that the loss of stroke by interconnecting the cells at the corrugation instead of at the center is relatively small and may also be expressed as the amount $s'$ in an unloaded condition. Experiments have shown that an outward force, such as exerted by a spring, used for loading a valve, will practically not reduce the stroke of a cell having a single corrugation and that the actuator will correctly respond to the changes in air pressure or air density.

As it is well known in the art a pressure responsive diaphragm cell is evacuated while a density responsive cell contains a charge of gas.

Besides possessing the feature of inclosing a small volume relatively to a large surface, the frustum-shaped shells offer the advantage of being proof against excessive load. When acted upon by an overload, the walls of the cell simply contact without causing deformation or damage to the cell.

What is claimed is:

1. Diaphragm cell actuator comprising a plurality of superposed cells of thin flexible sheet metal each of said cells being tightly sealed, each cell wall having an annular outwardly projecting corrugation, said corrugation being metallically secured to the respective corrugation of the adjoining cell.

2. Diaphragm cell actuator comprising a plurality of superposed cells of thin flexible sheet metal each of said cells being tightly sealed, consisting of two frustum-shaped shells tightly connected at the rim and provided each with a single outwardly projecting annular corrugation, said corrugations being metallically secured to the respective corrugation of the adjoining cell.

3. Diaphragm cell actuator comprising a plurality of superposed cells of thin flexible sheet metal, each of said cells being tightly sealed and consisting of two shells tightly connected at the rim and provided each with a single outwardly projecting annular corrugation, said corrugation being metallically secured to the respective corrugation of the adjoining cell.

EWALD BECKER.